United States Patent
Faudou et al.

(10) Patent No.: US 8,286,670 B2
(45) Date of Patent: Oct. 16, 2012

(54) METHOD FOR CONTROLLED FILLING OF PRESSURIZED GAS TANKS

(75) Inventors: Jean-Yves Faudou, Corenc (FR); Jean-Yves Lehman, Paris (FR); Jaya-Sitra Pregassame, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1190 days.

(21) Appl. No.: 11/766,924

(22) Filed: Jun. 22, 2007

(65) Prior Publication Data

US 2009/0044877 A1 Feb. 19, 2009

(51) Int. Cl.
*B65B 31/00* (2006.01)

(52) U.S. Cl. .......... 141/4; 141/95; 141/192

(58) Field of Classification Search ............ 141/2, 4, 141/94–95, 192
See application file for complete search history.

(56) References Cited

U.S. PATENT DOCUMENTS

| | | | |
|---|---|---|---|
| 3,719,196 A | 3/1973 | McJones | |
| 3,776,034 A | 12/1973 | Kolb | |
| 4,173,891 A | 11/1979 | Johnson | |
| 4,527,600 A | 7/1985 | Fisher et al. | |
| 4,648,430 A | 3/1987 | Di Gianfilippo et al. | |
| 4,705,082 A | 11/1987 | Fanshawe et al. | |
| 4,749,384 A | 6/1988 | Nowobilski et al. | |
| 4,903,496 A | 2/1990 | Mandrin | |
| 4,993,462 A | 2/1991 | Oxley et al. | |
| 5,201,581 A | 4/1993 | Vander Heyden et al. | |
| 5,238,030 A | 8/1993 | Miller et al. | |
| 5,243,821 A | 9/1993 | Schuck et al. | |
| 5,343,758 A | 9/1994 | Ingrain et al. | |
| 5,396,806 A | 3/1995 | Dechene et al. | |
| 5,406,988 A | 4/1995 | Hopkins | |
| 5,409,046 A | 4/1995 | Swenson et al. | |
| 5,431,203 A | 7/1995 | Schultz et al. | |
| 5,479,966 A | 1/1996 | Tison et al. | |
| 5,488,978 A * | 2/1996 | Kountz et al. | 141/4 |
| 5,570,729 A | 11/1996 | Mutter | |
| 5,628,349 A | 5/1997 | Diggins et al. | |
| 5,641,005 A | 6/1997 | Kountz et al. | |
| 5,653,269 A | 8/1997 | Miller et al. | |
| 5,752,552 A | 5/1998 | Kountz et al. | |
| 5,771,947 A * | 6/1998 | Kountz et al. | 141/4 |
| 5,771,948 A | 6/1998 | Kountz et al. | |
| 5,810,058 A | 9/1998 | Kountz et al. | |

(Continued)

FOREIGN PATENT DOCUMENTS

DE 10218678 11/2002

(Continued)

OTHER PUBLICATIONS

International Search Report for PCT/FR2005/050947.

(Continued)

*Primary Examiner* — Gregory Huson
*Assistant Examiner* — Nicolas A Arnett
(74) *Attorney, Agent, or Firm* — Christopher J. Cronin

(57) ABSTRACT

The invention concerns a method for filling pressurized gas tanks, characterized in that the filling process is interrupted when the input pressure reaches a maximum filling pressure, the maximum filling pressure in the cylinder being calculated to match the most serious of the two following conditions: nominal filling capacity or design temperature of the cylinders.

21 Claims, 1 Drawing Sheet

U.S. PATENT DOCUMENTS

| | | | |
|---|---|---|---|
| 5,832,906 A | 11/1998 | Douville et al. | |
| 5,868,176 A * | 2/1999 | Barajas et al. | 141/95 |
| 5,881,779 A | 3/1999 | Kountz et al. | |
| 5,901,758 A * | 5/1999 | Hwang et al. | 141/2 |
| 5,983,183 A | 11/1999 | Tabet et al. | |
| 6,598,624 B2 | 7/2003 | Togasawa et al. | |
| 6,619,336 B2 | 9/2003 | Cohen et al. | |
| 6,655,422 B2 * | 12/2003 | Shock | 141/4 |
| 6,672,340 B2 * | 1/2004 | Mutter | 141/4 |
| 6,708,573 B1 | 3/2004 | Cohen et al. | |
| 6,779,568 B2 * | 8/2004 | Borck | 141/95 |
| 6,786,245 B1 * | 9/2004 | Eichelberger et al. | 141/4 |
| 6,810,924 B2 | 11/2004 | White | |
| 7,059,364 B2 * | 6/2006 | Kountz et al. | 141/4 |
| 7,152,637 B2 * | 12/2006 | Hoke, Jr. | 141/94 |
| 7,178,565 B2 * | 2/2007 | Eichelberger et al. | 141/4 |
| 7,568,507 B2 * | 8/2009 | Farese et al. | 141/95 |
| 2002/0014277 A1 | 2/2002 | Togasawa et al. | |
| 2002/0053365 A1 | 5/2002 | Mutter | |
| 2003/0146106 A1 | 8/2003 | Mitlitsky | |
| 2005/0178463 A1 | 8/2005 | Kountz et al. | |

FOREIGN PATENT DOCUMENTS

| | | |
|---|---|---|
| EP | 0393859 | 10/1990 |
| EP | 0933583 | 8/1999 |
| EP | 1004779 | 5/2000 |
| EP | 1 146 277 | 10/2001 |
| EP | 1 205 704 | 5/2002 |
| EP | 1 331 289 | 7/2003 |
| EP | 1 336 795 | 8/2003 |
| EP | 1 398 603 | 3/2004 |
| EP | 1 452 794 | 9/2004 |
| EP | 1593905 | 11/2005 |
| EP | 1688660 | 8/2006 |
| EP | 1691127 | 8/2006 |
| EP | 1772663 | 4/2007 |
| EP | 1818597 | 8/2007 |
| EP | 1865248 | 12/2007 |
| GB | 1131850 | 10/1968 |
| JP | 10103596 | 4/1998 |
| JP | 2002115796 | 4/2002 |
| JP | 2004324799 | 11/2004 |
| WO | WO 98/36211 | 8/1998 |
| WO | WO 01/38780 | 5/2001 |
| WO | WO 2004/020287 | 3/2004 |
| WO | WO 2004/023029 | 3/2004 |

OTHER PUBLICATIONS

English translation of Japanese Official Action, mailed Jun. 7, 2011 for JP 2007-547583.

* cited by examiner

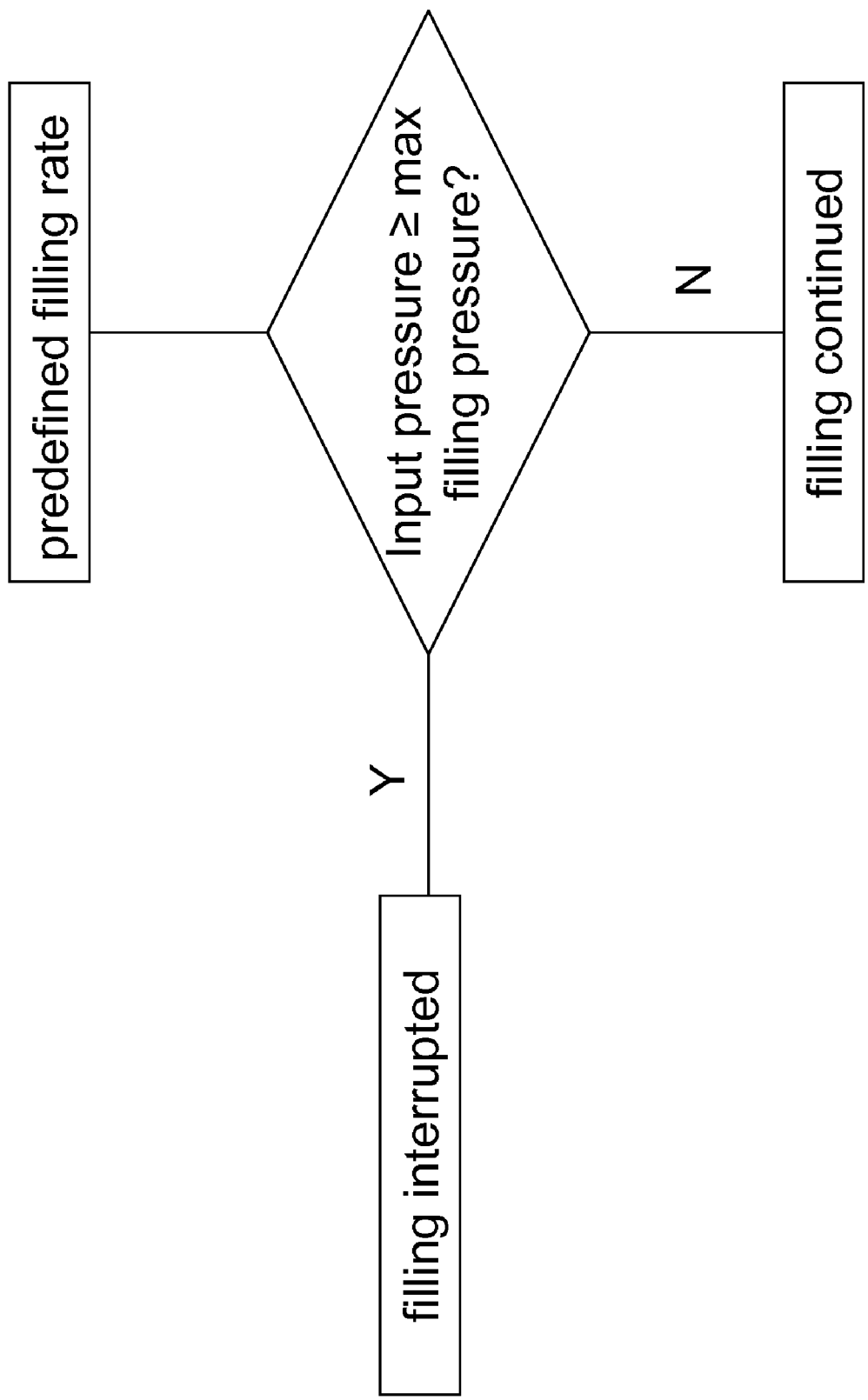

METHOD FOR CONTROLLED FILLING OF PRESSURIZED GAS TANKS

BACKGROUND

The invention relates to a method for controlling the filling of gas cylinders.

In the present invention, the terms "cylinders" and "tanks" which designate hermetically sealed containers for storing pressurized gas, are used as equivalents.

Since environmental conservation is becoming an increasingly pressing concern both for industrial companies and for private individuals, demand for "clean" fuels for motor vehicles is steadily growing.

One possible alternative for replacing conventional fuels is the use of gas.

However, while filling a tank with gasoline or fuel oil, which are liquid fuels, is an easy and rapid operation, filling tanks with gas is a much more delicate operation. Owing to the compressibility of gases, the filling can lead to considerable temperature rise and also raises the problem of "metering" the quantity of material transferred.

In fact, the gas must be injected from a gas storage zone into pressurized gas tanks or cylinders (200 bar or more depending on the gas and the application); the storage zone is itself under high pressure or under low pressure, in which case it is necessary to use a compressor.

For safety reasons, the final pressure in the tank, as well as the temperature of the gas in the tank and the mass of gas stored, must not exceed the tank strength limits as determined by the manufacturers of said tanks. Moreover, the faster the filling, the greater the temperature rise, and hence the more difficult it is to optimize the quantity of gas inside the tank.

Tanks are accordingly very often filled below their capacity, filling occurs more frequently, and consumption is difficult to assess, providing a source of discomfort for the user.

Furthermore, it must be observed that the gas temperature inside the cylinder is very difficult to obtain because it would require the installation of a temperature probe placed directly in the cylinder, with all the sealing problems that this implies, and a connection between the vehicle and the storage station for the exchange of data.

Obviously, the same difficulties arise for the supply of gas to all types of tanks or cylinders.

Conventionally, the filling takes place at ambient temperature, using the principle whereby the measured parameters are controlled and/or the maximum values of these parameters are estimated, that is, the pressure and/or temperature, using the onboard temperature measurement, that is, the measurement of the gas temperature in the cylinders, as in patent applications EP1205704 and EP1336795, or by using the measurement of the mass injected, obtained by weighing (U.S. Pat. Nos. 4,527,600, 4,648,430, 5,791,947, 5,771,948, 5,810,058, 5,881,779) or by measuring the flow rate (U.S. Pat. Nos. 4,993,462, 5,238,030, 5,752,552).

Furthermore, another method for overcoming the problem of insufficient filling consists in cooling the gas entering the cylinder to a temperature set at a value below the ambient temperature, as described in patent application EP1331289. However, the temperature selected is not optimized and does not represent a comprehensive solution for the optimal and safe filling of the cylinders.

Document EP 1 452 794 A2 describes a filling method at a rate depending on the ambient temperature, the filling being interrupted when the temperature measured in the tank reaches a maximum limit.

Document U.S. Pat. No. 5,628,349 describes a filling method and a filling rate which depends on the gas temperature measured in the tank.

Document U.S. Pat. No. 6,598,624 describes a filling method in which the filling rate is adjusted according to the instantaneous pressure measured in the tank.

All the methods described are either difficult to implement because the parameters to be measured are relatively inaccessible, particularly the internal temperature of the gas, or are inappropriate for certain applications, such as weighing for the vehicle application, or use measurement means which lack accuracy in certain cases, particularly instruments for measuring the mass flow rate in the case of hydrogen, so that the maximum temperature in the cylinder is not controlled, or which do not permit optimization of the filling.

Thus a real need exists for a method for controlling the filling of gas cylinders or tanks which is at once reliable regardless of the data available to the operator, and particularly when he cannot determine the temperature in the tanks, easy to implement, easy to use and suitable for any type of cylinder and any type of filling, particularly for rapid fillings.

SUMMARY OF THE INVENTION

The following terms are used in the present invention.

The "nominal pressure" or "working pressure" is the maximum pressure that the gas feed can reach at a uniform temperature, for example at 15° C. (288K), the cylinder being full.

The "nominal temperature" is the temperature at which the nominal pressure of the cylinder is defined (typically 15° C.).

The "cylinder design temperature" is the maximum temperature which can be reached in a cylinder in service, this value being given by the manufacturer.

The "nominal filling capacity" is the mass of gas which can be stored in a given cylinder. This value is also specified by the manufacturer and is generally given in the form of a nominal pressure at a nominal temperature.

The "maximum permissible pressure" of the cylinder is the maximum pressure which must not be exceeded in a cylinder in service.

The present inventors, following lengthy and thorough research, have found that the various requirements listed could be met by calculating a maximum filling pressure corresponding to the more severe of the following two conditions: nominal filling capacity and cylinder design temperature. If the final filling pressure is lower than or equal to this maximum filling pressure, the filling operation remains within the operating limits of the cylinder.

This method is called "safe" because it serves to satisfy the two safety limit values, that is, the nominal capacity and the maximum permissible temperature of the cylinder.

The maximum filling pressure is preferably calculated as a function of the ambient temperature and the initial pressure, which are previously measured, and of the filling rate expressed for example in pressure units per unit time (in bar/seconds for example).

In practice, the initial cylinder pressure is first measured by balancing the connector and the filling line with the cylinders by injecting a small quantity of gas. The ambient temperature is also measured at the filling station. The ambient temperature measured at the station must be representative of the atmosphere around the cylinders. In general, the temperature measured at the filling terminal is fairly representative of the temperature at the cylinders, but it may be useful to confirm this. The system then calculates the maximum pressure corresponding to the nominal mass or to the design temperature, using the measured parameters, that is the ambient temperature and the initial pressure in the cylinder, and using the value of the rate determined in pressure units per unit time. During the filling, the gas pressure is measured at the connector or the filling line, downstream of the sonic element. The pressure measured at this level is equal to the pressure in the cylinders during filling. A programmable controller then calculates the derivative of this pressure with respect to time and this parameter is representative of the tank filling rate. The filling is then interrupted when the pressure in the cylinders reaches the maximum value thus calculated. Thus the filling has been controlled exclusively using the measured input pressure.

According to the invention, it is therefore not necessary to measure the tank temperature in real time.

According to another particular embodiment, the value of the derivative of the gas input pressure as a function of filling time or rate in pressure units per unit time can be determined by two criteria:

Either the filling rate must serve to obtain a minimum filling ratio of the cylinder commensurate with its nominal filling capacity, and regardless of the filling time. This minimum filling ratio is an intrinsic datum of the system and corresponds to a value compatible with the client's requirements. In the field of hydrogen vehicle filling, for example, the client may typically demand a minimum filling ratio of 90%, for example.

Or the filling rate must serve to complete the filling within a given maximum period of time and regardless of the filling ratio at the end of filling. This maximum filling time is an intrinsic datum of the system and corresponds to a value compatible with the client's requirements. In the field of hydrogen vehicle filling, for example, the client may typically demand a maximum filling time of 3 minutes, for example.

Once the criterion is selected, the filling rate may then depend on the ambient temperature and the previously measured initial pressure.

These choices (which criterion and which limit value) can be left to the initiative of the client or the operator of the filling station, and can be made before each new filling or fixed for all fillings.

This rate is typically between 0.05 bar/s and 20 bar/s preferably between 0.10 and 15 bar/s and even more preferably between 0.5 bar/s and 12 bar/s.

According to an advantageous alternative, the filling can be carried out "cold" that is, the filling is carried out with gas cooled to a given temperature.

According to this particular embodiment, the gas input temperature in the cylinder is calculated according to the following parameters: the initial pressure, ambient temperature, final filling pressure and filling rate, to obtain the nominal storage capacity of the cylinder, in a given filling time, while complying with the operating limits of the cylinder.

The final pressure can be set arbitrarily or according to the process conditions, for example. However, it must be lower than the maximum permissible pressure for the cylinder. For example, in the case in which the pressurized cylinder is filled by balancing pressurized storage vessels, the final pressure is limited by the storage pressure of the vessels, or even to a lower value because of the pressure balancing.

The input gas temperature thus determined serves to meet the following two conditions: the nominal capacity is reached and the operating limits of the cylinder are respected.

This method is both "safe" and "optimal", because it helps to optimize the mass of gas finally stored in the cylinder, while complying with the operating limits of the cylinder.

In practice, the initial pressure of the cylinders is first measured by balancing the connector and the filling line with the cylinders by injecting a small quantity of gas. The ambient temperature is also measured at the filling station. The ambient temperature measured at this station must be representative of the atmosphere surrounding the cylinders. In general, the temperature measured at the filling terminal is fairly representative of the temperature at the cylinders, but it may be useful to confirm this. A filling rate in pressure units per unit time is determined. A final filling pressure is also set by the operator.

The system then calculates a gas temperature at the cylinder inlet using the following measured parameters: ambient temperature, initial pressure in the cylinder (measured at the connector), and using the final pressure set by the operator or by the process conditions, and the value of the derivative of the pressure with respect to time.

If the temperature thus calculated is higher than the ambient temperature, the operator implements the method according to the embodiment previously described (filling is interrupted when the input pressure reaches the maximum filling pressure corresponding to the more severe of the following two conditions: nominal filling capacity and cylinder design temperature).

If the temperature thus calculated is lower than the ambient temperature, the gas entering the cylinder must be cooled to this temperature. The input temperature thus calculated allows filling up to the nominal load while remaining within the operating limits of the cylinder, the filling is terminated when the pressure in the cylinders reaches the predefined pressure.

According to another "cold" filling mode, the filling temperature is a fixed condition. In this case, the final filling pressure may be the pressure calculated to permit effective filling.

According to this particular embodiment, the final filling pressure is determined and calculated according to the following parameters: the initial pressure, ambient temperature, gas temperature entering the cylinder and filling rate, in order to reach the nominal storage capacity of the cylinder, in a given filling time, while complying with the operating limits of the cylinder.

The inventive method is particularly useful for rapid fillings, especially rapid fillings of motor vehicles.

In the present invention, a rapid filling is a filling which must be completed in a period of between less than 1 minute and 10 minutes. This time depends on the cylinders to be filled and/or the type of vehicle (scooter, car or bus, for example).

The present invention is usable regardless of the type of gas. It may, for example, concern methane, hydrogen, oxygen, nitrogen, helium, etc. The vehicle application is particularly aimed at natural gas or methane and hydrogen.

The cylinders or tanks have a variable capacity according to their purpose. For example, for private cars, the total capacity is about 100 to 150 L. The vehicle may be equipped with a single tank of this capacity or a plurality of smaller tanks placed in parallel.

Advantageously, the shape of the cylinder must be such that at the end of filling, it provides for obtaining a uniform gas temperature. This feature depends on the geometry of the cylinder, which is advantageously generally cylindrical in shape, with a ratio of length L to diameter D, L/D, lower than 6, preferably between 1 and 5, and even more preferably between 1 and 4.

Furthermore, advantageously, the tanks to be filled are arranged horizontally or vertically, and in this case, the filling is carried out from the top downward.

BRIEF DESCRIPTION OF THE DRAWINGS

The FIGURE is a flow chart of the method of the invention.

The invention is described in greater detail in the following examples, which are provided exclusively to illustrate the invention and are nonlimiting.

EXAMPLES

Examples 1 and 2

Safe Filling by Estimation of the Final Pressure

In examples 1 and 2 below, the cylinder used is a Dynetek 150 L cylinder.
The filling gas is hydrogen.
The following notations are used:
Pf=final pressure in bar, Pf=Min ($Pf_{85°\ C.}$; $Pf_{100\%\ mass}$) where $Pf_{100\%\ mass}$ is the limit pressure above which the nominal mass stored in the cylinder is exceeded and $Pf_{85°\ C.}$ is the limit pressure above which the temperature limit of the cylinder is exceeded.
Tamb=ambient temperature in K
P0=initial pressure in bar
(P0, 15° C.)=initial pressure normed to 15° C. in bar
V=rate in bar/s
Tr=filling gas temperature (K)
Tf=final temperature in K.
Calculation Equations
$Pf_{100\%\ mass}$, which is the limit final pressure above which the nominal mass stored in the cylinder is exceeded, is determined by the following equation (1):

$$\frac{Pf_{100\%\ mass}}{Tamb} = (a \times LN(V) + b) \times (P0, 15° C.) + c \times LN(V) + d \quad (1)$$

Where a, b, c, and d are coefficients obtained by regression (by tests or simulations). These coefficients may optionally be specific to a type of cylinder.

$Pf_{85°\ C.}$, which is the final limit pressure above which the cylinder design temperature is exceeded, is determined by the following equation (2):

$$Pf_{85°\ C.} = AA \times P0^3 + BB \times P0^2 + CC \times P0 + DD$$

Where $$AA = aaa \times Tamb^2 + aab \times Tamb + aac$$

$$BB = bba \times Tamb^2 + bbb \times Tamb + bbc$$

$$CC = cca \times Tamb^2 + ccb \times Tamb + ccc$$

$$DD = dda \times Tamb^2 + ddb \times Tamb + ddc$$

And where the coefficients aaa, aab, aac, bba, bbb, bbc, cca, ccb, ccc, dda, ddb and ddc are third order polynomials of the filling rate V.

The various coefficients determined are specific to a type of cylinder and are determined by regression (by tests or simulations).

For cold filling, $Pf_{100\%\ mass}$ which is the final limit pressure above which the nominal mass stored in the cylinder is exceeded, is determined by the following equation:
$Pf_{100\%\ mass} = Tamb \times [(a \times LN(V) + b) \times (P0, 15° C.) + (c \times LN(V) + d)] + (e + f \times P0 + g \times V) \times (Tr - Tamb)$ Where a, b, c, d, e, f and g are coefficients obtained by regression (by tests or simulations). These coefficients may be specific to a type of cylinder a, b, c, and d may be the same coefficients as those used for filling with gas at ambient temperature.

Example 1

The operator wishes to fill a Dynetek 150 L cylinder whereof the maximum service temperature is 85° C. (358K) with hydrogen.

He measures the ambient temperature (32° C.) and the initial pressure at the cylinder inlet (50 bar). He decides to fill this cylinder at a rate of 2 bar per second.

The computer then advises him using the equation (1) that $Pf_{100\%\ mass}$=447 bar and that $Pf_{85\%}$=304 bar. The final filling pressure is then equal to the lower of these two values or 304 bar.

The operator adjusts the filling rate to 2 bar per second and starts filling while measuring the pressure at the connector, as indicated previously. A programmable controller calculates the derivative of this pressure with respect to time for controlling the rate of rise in pressure with respect to the setpoint of 2 bar/s.

When this pressure reaches 304 bar, the filling is stopped.

The filling protocol thus followed is summarized in the table below.

| Parameter | Value | Determination Method |
| --- | --- | --- |
| Ambient temperature | 32° C. | Fixed measurement |
| Initial pressure | 50 bar | Fixed measurement |
| Filling rate | 2 bar/s | Operator's choice |
| Maximum permissible pressure | 304 bar | Calculation |
| Filling ratio | 70% | Calculation |
| Final temperature[1] | 85° C. | Calculation |
| Total filling time | 2.1 min | Calculation |

[1]parameter limiting the filling

Example 2

The operator wishes to fill a Dynetek 150 L cylinder whereof the maximum temperature is 85° C. (358K).

He measures the ambient temperature (20° C.) and the initial pressure at the cylinder inlet (60 bar). He then decides to fill this cylinder at the rate of 2 bar per second.

The computer advises him with the help of the following equation that for a 100% filling, the final pressure is 427 bar.

The final pressure corresponds to a final temperature of 85° C. and is higher than 438 bar. The lower of the two values clearly corresponds to 427 bar.

The operator then adjusts the filling rate to 2 bar per second and starts filling while measuring the pressure at the connector, as indicated previously. A programmable controller calculates the derivative of this pressure with respect to time for controlling the rate of rise in pressure with respect to the setpoint of 2 bar/s. The filling is interrupted when the pressure reaches 427 bar.

The filling protocol thus followed is summarized in the table below.

| Parameter | Value | Determination Method |
| --- | --- | --- |
| Ambient temperature | 20° C. | Fixed measurement |
| Initial pressure | 60 bar | Fixed measurement |
| Filling rate | 2 bar/s | Operator's choice |
| Maximum permissible pressure | 427 bar | Calculation |
| Filling ratio[1] | 100% | Calculation |
| Final temperature | 77° C. | Calculation |
| Total filling time | 3.1 min | Calculation |

[1]parameter limiting the filling

Example 3

Safe Filling Optimized by Estimation of the Input Temperature

The operator wishes to fill with hydrogen a Dynetek 150 L type cylinder whereof the service pressure is 350 bar and which can withstand a maximum pressure of 438 bar. The operator wishes to terminate the filling at a pressure of 400 bar.

The operator measures the ambient temperature (35° C.) and the pressure at the cylinder inlet (30 bar). He decides to fill this cylinder at the rate of 1.25 bar per second.

The computer advises him that the filling must be carried out at a gas input temperature of −33° C.

The operator then adjusts the gas input temperature to −33° C. and the filling rate to 1.25 bar per second, and starts filling while measuring the pressure in the cylinder. The pressure is measured dynamically at the connector.

A programmable controller calculates the derivative of this pressure with respect to time for controlling the rate of rise in pressure with respect to the setpoint of 1.25 bar/s.

When the pressure in the cylinder reaches 400 bar, the filling is stopped.

The filling protocol thus followed is summarized in the table below.

| Parameter | Value | Determination Method |
| --- | --- | --- |
| Ambient temperature | 35° C. | Instantaneous measurement |
| Initial pressure | 30 bar | Fixed measurement |
| Filling rate | 1.25 bar/s | Operator's choice |
| Final pressure | 400 bar | Operator's choice |
| Filling temperature | −33° C. | Calculation |

Example 4

The operator then wishes to fill the same cylinder with a gas available at 0° C. The filling conditions are: ambient temperature=30° C. and cylinder input pressure=15 bar. The operator wishes to fill the cylinder at the rate of 2 bar per second.

The computer advises him that the filling must be interrupted at a pressure of 425 bar.

The operator then adjusts the gas input temperature to 0° C. and the filling rate to 2 bar per second and starts filling while measuring the pressure in the cylinder. When the pressure in the cylinder reaches 425 bar, the filling is stopped.

The filling protocol thus followed is summarized in the table below.

| Parameter | Value | Determination Method |
| --- | --- | --- |
| Ambient temperature | 30° C. | Instantaneous measurement |
| Initial pressure | 15 bar | Fixed measurement |
| Filling rate | 2 bar/s | Operator's choice |
| Filling temperature | 0° C. | Operator's choice |
| Final pressure | 425 bar | Calculation |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a pressurized gas cylinder, comprising the steps of:
   selecting a predetermined filling rate; selecting the more severe of the following two conditions: nominal cylinder filling capacity or cylinder design temperature; calculating the maximum filling pressure in the cylinder to match the selected condition; and
   filling a pressurized gas cylinder with a gas at the predetermined filling rate;
   controlling an input pressure of the gas;
   comparing the input pressure and the maximum filling pressure; and
   ending said step of filling when the input pressure reaches the maximum filling pressure.

2. The method of claim 1, wherein the maximum filling pressure is calculated according to the ambient temperature and the initial pressure in the cylinder.

3. The method of claim 2, wherein the ambient temperature and the initial pressure in the cylinder are measured before filling.

4. The method of claim 1, wherein the maximum filling pressure is calculated according to the filling rate.

5. The method of claim 1, wherein the filling rate is selected according to a desired filling rate and/or according to a desired filling time.

6. The method of claim 5, wherein the filling rate is selected according to the ambient temperature and the initial pressure of the gas in the cylinder measured before filling.

7. The method of claim 1, wherein the filling rate is expressed as a derivative of the input pressure in the cylinder as a function of time and is between 0.05 bar/s and 20 bar/s.

8. The method of claim 7, wherein the filling rate is expressed as a derivative of the input pressure in the cylinder as a function of time and is between 0.10 and 15 bar/s.

9. The method of claim 7, wherein the filling rate is expressed as a derivative of the input pressure in the cylinder as a function of time and is between 0.5 bar/s and 12 bar/s.

10. The method of claim 1, wherein the filling rate is selected either by the operator at the time of filling or automatically.

11. The method of claim 1, wherein the filling is controlled only using the input pressure in the cylinder.

12. The method of claim 1, wherein the cylinder is filled at a filling temperature calculated according to the initial pressure, the ambient temperature and the maximum filling pressure.

13. The method of claim 12, wherein the filling temperature is calculated according to the filling rate.

14. The method of claim 13, wherein the maximum filling pressure is calculated according to the initial pressure, the ambient temperature, the cylinder input gas temperature and the filling rate.

15. The method of claim 12, wherein the calculated filling temperature is lower than the ambient temperature.

16. The method of claim 1, wherein the cylinder is generally cylindrical in shape with a ratio of length L to diameter D, L/D, lower than 6.

17. The method of claim 16, wherein the cylinder is generally cylindrical in shape with a ratio of length L to diameter D, L/D, between 1 and 5.

18. The method of claim 1, wherein the maximum filling pressure ($Pf_{100\%\ mass}$) is calculated to match the nominal filling capacity of the cylinder and is calculated by the equation:

$$\frac{Pf_{100\%\ mass}}{Tamb} = (a \times LN(V) + b) \times (P0, 15°\ C.) + c \times LN(V) + d \quad (1)$$

where:
- a) Tamb is the ambient temperature in K;
- b) V is the cylinder filling rate in bar/second;
- c) P0 is the initial pressure in bar, and (P0, 15° C.) is the initial pressure normed to 15° C. in bar; and
- d) a, b, c, and d are coefficients determined by regression.

19. The method of claim 1, wherein the maximum filling pressure ($Pf_{0.100\%\ mass}$) is calculated to match the nominal filling capacity of the cylinder and is calculated by the equation:

$$Pf_{100\%\ mass} = Tamb \times [(a \times LN(V)+b) \times (P0,15°\ C.)+(c \times LN(V)+d)]+(e+f \times P0+g \times V) \times (Tr-Tamb) \quad (2)$$

where:
- a) Tamb is the ambient temperature in K;
- b) Tr is the filling gas temperature in K;
- c) V is the cylinder filling rate in bar/second;
- d) P0 is the initial pressure in bar, and (P0, 15° C.) the initial pressure normed to 15° C. in bar; and
- e) a, b, c, d, e, f and g are coefficients determined by regression.

20. The method of claim 1, wherein the maximum filling pressure (Pf 85° C.) is calculated to match the cylinder design temperature and is calculated by a polynomial equation of the type:

$$Pf_{85°\ C.} = AAP0^n + BBP0^{n-1} + CCP0^{n-2} + DDP0^{n-3} + \ldots + ZZ$$

where:
- a) P0 is the initial pressure in bar;
- b) n is an integer and is at least equal to 3; and
- c) and the coefficients AA, BB, CC, ..., ZZ are polynomial functions of the filling rate specific to the filled cylinder and obtained by regression.

21. The method of claim 1, wherein the cylinder is generally cylindrical in shape with a ratio of length L to diameter D, L/D, between 1 and 4.

* * * * *

UNITED STATES PATENT AND TRADEMARK OFFICE
CERTIFICATE OF CORRECTION

PATENT NO. : 8,286,670 B2
APPLICATION NO. : 11/766924
DATED : October 16, 2012
INVENTOR(S) : Jean-Yves Faudou et al.

It is certified that error appears in the above-identified patent and that said Letters Patent is hereby corrected as shown below:

In the Claims:

Column 9, Line 19, Change "(P0, 15° C.)" to --(P0, 15° C)--

Column 9, Line 25, Change "(P0, 15° C.)" to --(P0, 15° C)--

Column 9, Line 26, Change "15° C." to --15° C--

Column 9, Line 29, Change "0.100%" to --100%--

Column 10, Line 1, Change "(P0, 15° C.)" to --(P0, 15° C)--

Column 10, Line 8, Change "(P0, 15° C.)" to --(P0, 15° C)--

Column 10, Line 9, Change "15° C." to --15° C--

Column 10, Line 13, Change "(Pf85° C.)" to --(Pf85° C)--

Column 10, Line 18, Change "Pf85° C." to --Pf85° C--

Signed and Sealed this
First Day of October, 2013

Teresa Stanek Rea
*Deputy Director of the United States Patent and Trademark Office*